A. MILBURN.
AIR FILTER FOR INTERNAL COMBUSTION ENGINES.
APPLICATION FILED MAR. 18, 1921.
1,414,993. Patented May 2, 1922.
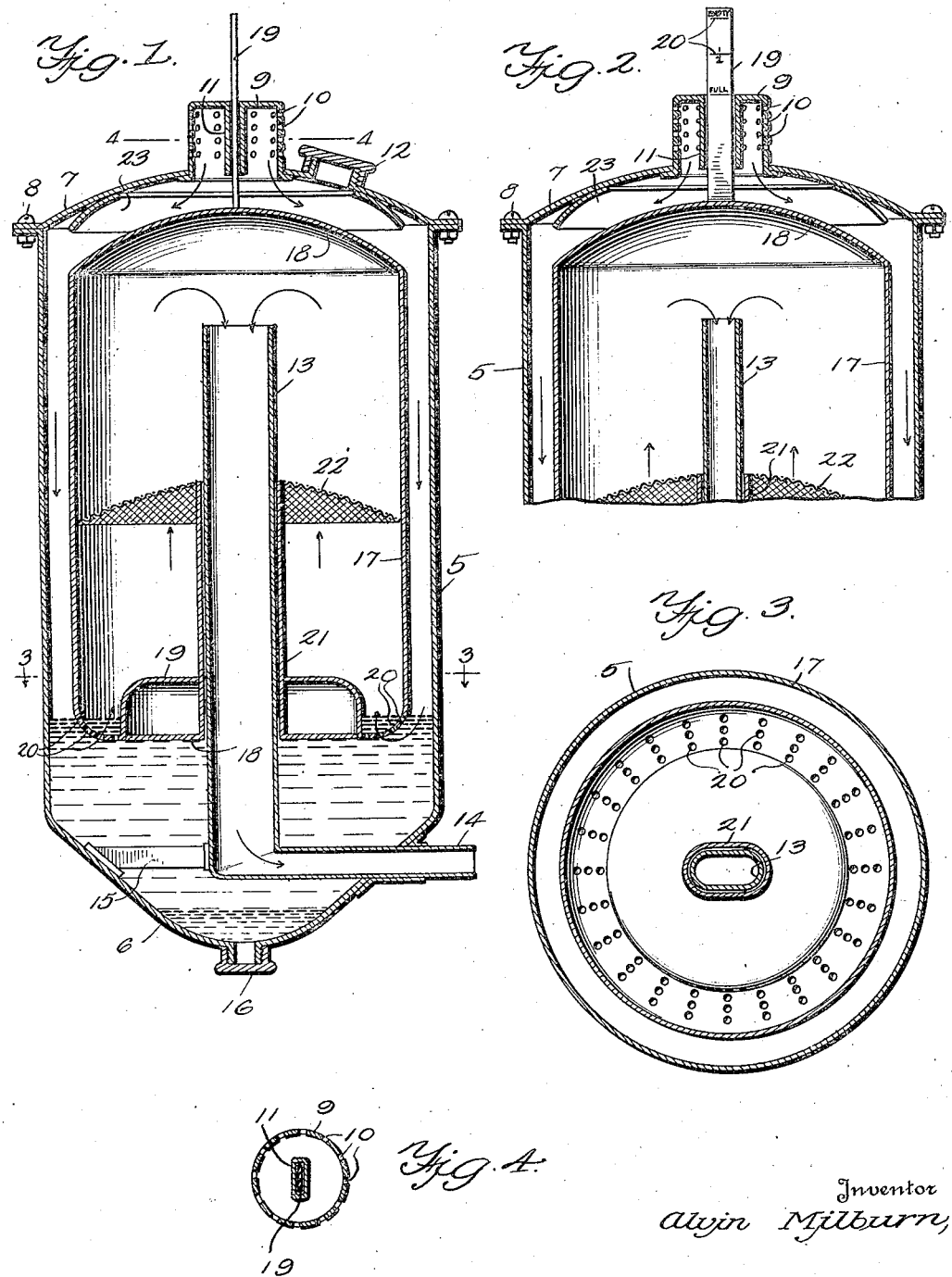

UNITED STATES PATENT OFFICE.

ALVIN MILBURN, OF KEENSBURG, ILLINOIS.

AIR FILTER FOR INTERNAL-COMBUSTION ENGINES.

1,414,993.    Specification of Letters Patent.    Patented May 2, 1922.

Application filed March 18, 1921. Serial No. 453,289.

*To all whom it may concern:*

Be it known that I, ALVIN MILBURN, a citizen of the United States, residing at Keensburg, in the county of Wabash and State of Illinois, have invented certain new and useful Improvements in Air Filters for Internal-Combustion Engines, of which the following is a specification.

This invention relates to air filters for internal combustion engines.

In the operation of internal combustion engines, particularly those in use in farm tractors and the like, it is essential that the air admitted into the carburetor be free from dust and grit which cause damage to the moving parts of the engine and shorten the life thereof.

An important object of the present invention is to provide a device of the above mentioned character which will prevent the blowing out of water when the engine backfires.

A further object of the invention is to provide means for ascertaining positively whether the float is operating properly.

A further object of the invention is to provide a device which will be simple in construction, cheap to manufacture, efficient in operation, and to provide such a construction which permits the ready removal of sediment collected in the water therein.

In the drawings forming a part of this specification, and in which like numerals are employed to designate like parts throughout.

Figure 1 is a central vertical longitudinal sectional view through the device,

Figure 2 is a similar view of the upper portion of the device taken in a plane at right angles to Figure 1, Figure 3 is a section taken on the line 3—3 of Figure 1, and Figure 4 is a section taken on the line 4—4 of Figure 1.

In the drawings, wherein for the purpose of illustration is shown a preferred embodiment of the invention, the numeral 5 designates a fixed casing which is preferably vertically arranged and cylindrical in form. The casing 5 is provided with a preferably integral bottom 6, shaped as shown, and a preferable removable top 7 secured to the casing 5 by means of bolts 8 or the like.

An inlet dome 9 is arranged in the top 7, preferably centrally thereof, and projects upwardly therebeyond. The dome 9, is provided with openings 10 for the admission of air. A preferably rectangular guide 11 is provided, preferably integral with the dome 9, and extends a substantial distance downwardly from the top thereof for a purpose to be described. The top 7 is provided with a filler cap 12 through which water may be poured into the casing.

The numeral 13 designates a stationary air pipe arranged centrally of the casing 5 and having its ends terminating substantial distances from the top 7 and bottom 6 of the casing 5. A substantially horizontal air outlet pipe 14 is mounted in the bottom 6 of the casing 5 and has its inner end communicating with the lower end of the air pipe 15. The outer end of the pipe 14 projects outwardly of the casing and is adapted for connection with the air inlet of the carburetor of the engine. A bracket 15 is connected between the bottom 6 and the side of the pipe 13 opposite the pipe 14 whereby the pipe 13 may be securely fixed with respect to the casing 5 as clearly shown in Figure 1. The pipe 14 is spaced from the lower end of the bottom 6 and the latter is provided with a screw threaded cap 16 which may be removed for cleaning out the sediment which collects at the bottom of the water.

The numeral 17 designates a vertically movable preferably cylindrical casing arranged within the casing 5 and spaced therefrom. The casing 17 has a preferably integral top 18 which has secured thereto, substantially centrally thereof, a gage member 19. As shown in Figures 1 and 2 the gage member 19 projects through the guide 11 and is slidable therein. The upper end of the gage member 19 projects upwardly beyond the top of the dome 19 and is provided with suitable markings 20 by which the water level within the casing 5 may be ascertained, as will be obvious.

The casing 17 is provided with a preferably integral bottom 18' forming the lower wall of a float 19. As shown, the outer portion of the float 19 is spaced from the side walls of the casing 17. The bottom 18', between the float 19 and the side walls of the casing 17, is perforated as at 20. The numeral 21 designates an upstanding guide pipe surrounding the air pipe 13, and secured to the bottom 18 of the casing 17. As shown in Figure 3, the pipes 13 and 21 are similarly shaped in cross section, other than round, whereby rotation of the casing 17 with respect to the casing 5 is prevented. A screen 22 is rigidly connected between the casing 17 and the upper end of the pipe 21 to fix the latter members with respect to each other. At this point it should be noted that the space between the inner and outer shells is small so that the inner casing is relatively large. The screen 22 is preferably arranged at such a height that the volume of the inner casing below the screen is equal to or greater than the volume of water within the outer casing.

In the normal position of the moving parts of the device, the top 18 of the casing 17 is normally spaced from the top 7 of the casing 5 to permit the flow inwardly of air, and the top 7 is preferably provided with a splash plate 23.

The operation of the device is as follows:

The cap 12 is removed and water introduced into the casing 5 until the gage indicates "full." At this position of the gage, the parts of the device are in the position indicated in Figures 1 and 2, and the displacement of the float is such that the level of the water is at or slightly above, the uppermost of the perforations 20. When the engine is operated, the suction created by the intake thereof causes the intake of air through the openings 10 in the dome 9. This air passes downwardly in the dome, outwardly between the caps 7 and 18, and downwardly between the casings 5 and 17. The suction of the engine creates a partial vacuum within the casing 17 drawing the water upwardly therein. The vacuum also draws downwardly on the top 18 and upwardly on the top of the float, and since the area of the top 18 is greater than the top of the float, the inner shell sinks until the bottom thereof rests upon the outlet pipe 14. That action of the vacuum in raising the water in the inner shell then causes air to enter the inner shell through the openings 20. The screen 22 prevents the splash of the water from reaching the upper end of the pipe 13. The air then passes through the screen 22 and into the end of the air pipe 13, from whence it is delivered through the horizontal pipe 14 to the intake of the engine. In the event of the engine back-firing, the pressure created in the pipe 13 impinges against the top 18 of the casing 17 causing it to be lifted somewhat permitting the air to escape through the perforations 20 without passing through the water in the casing. Thus it will be seen that little or no water will be forced outwardly between the side walls of the casing, and what little water is forced upwardly will be intercepted by the splash plate 23.

Devices of this kind are usually provided with floats to govern the height of the moving parts according to the amount of water contained in the casing, which is necessary for the efficient operation of the device. Such devices are also provided with glass gages to indicate the level of the water. There is, however, no co-action between the gages and the moving parts of the device so that the level of the water indicated by the gages is no indication of the proper operation of the moving parts. With my device, however, when water is introduced into the casing the operation of the moving parts is positively indicated by the gage member 19.

It is to be understood that the form of my invention herewith shown and described is to be taken as a preferred example of the same and with various changes may be resorted to in the shape, size, and arrangement of parts without departing from the spirit of the invention or the scope of the subjoined claims.

What I claim is:

1. In a device of the character described, a stationary vertical casing including a top and a bottom, said top being provided with inlet openings, a stationary outlet pipe having one end projecting upwardly within said stationary casing, and its other end projecting without the casing, a vertically movable casing mounted within said stationary casing and spaced therefrom, said last named casing being provided with a closed top, a bottom wall formed on said movable casing, and a float carried by said bottom wall and spaced from the side walls of said movable casing, said bottom wall being provided with openings arranged between said float and the side walls of said movable casing.

2. In a device of the character described, a stationary vertical casing including a top and a bottom, an inlet dome mounted in the top of said stationary casing and provided with openings, a gage guide carried by said dome, a vertical stationary air conduit mounted substantially centrally of said stationary casing, a vertically movable casing mounted in and spaced from said stationary casing and having a closed top, a guide pipe carried by said movable casing and surrounding said air conduit, a float carried by and mounted adjacent the bottom of said movable casing and spaced from the side walls thereof, a screen connecting between said float and the side walls of said movable casing, and a gage member carried by the top of said movable casing and slidable within said gage guide.

3. In a device of the character described, a stationary vertical casing including a top and a bottom and adapted to contain water, said top being provided with an inlet opening, a stationary outlet pipe having one end projecting upwardly within said casing and its other end projecting without the casing, a vertically movable casing mounted within said stationary casing and spaced therefrom, said movable casing being slidable upon said outlet pipe, and a float carried by said movable casing adjacent the bottom thereof, said float being spaced from the side walls of said movable casing, the volume of said inner casing being substantially greater than the volume of water within said stationary casing.

4. In a device of the character described, a stationary vertical casing including a top and a bottom and adapted to contain water, said top being provided with an inlet opening, a stationary outlet pipe having one end projecting upwardly within said casing and its other end projecting without the casing, a vertically movable casing mounted within said stationary casing and spaced therefrom, a guide pipe carried by said movable casing and slidable upon said outlet pipe, a float carried by said movable casing adjacent the bottom thereof, said float being spaced from the side walls of said movable casing, and a screen connected between the side walls of said movable casing and said guide pipe, the volume of said movable casing below said screen being greater than the volume of water within said stationary casing.

In testimony whereof I affix my signature in presence of two witnesses.

ALVIN MILBURN.

Witnesses:
 Roy C. Compton,
 M. B. Bruce.